(12) United States Patent
Viganò et al.

(10) Patent No.: US 8,211,985 B2
(45) Date of Patent: *Jul. 3, 2012

(54) SILICON-CONTAINING ETHYLENE-BASED POLYMER BLENDS, METHODS FOR MAKING SAME, AND ARTICLES MADE THEREFROM

(75) Inventors: Simone Viganò, Forest (BE); Gerd Artur Allermann, Overijse (BE); Stefan B. Ohlsson, Haacht (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 236 days.

This patent is subject to a terminal disclaimer.

(21) Appl. No.: 12/044,640

(22) Filed: Mar. 7, 2008

(65) Prior Publication Data

US 2008/0241553 A1    Oct. 2, 2008

Related U.S. Application Data

(60) Provisional application No. 60/920,984, filed on Mar. 30, 2007.

(51) Int. Cl.
 *C08F 255/02* (2006.01)
(52) U.S. Cl. ..... 525/342; 525/254; 525/288; 525/333.7; 525/240; 525/70; 428/391; 428/213; 428/516; 524/543; 522/122; 264/510; 526/348.5
(58) Field of Classification Search .................. 525/254, 525/342, 288, 333.7, 240, 70; 428/391, 213; 428/516; 522/114; 524/543; 526/348.5; 264/510
See application file for complete search history.

(56) References Cited

U.S. PATENT DOCUMENTS

| | | | |
|---|---|---|---|
| 4,614,764 | A | 9/1986 | Colombo et al. |
| 5,516,563 | A | 5/1996 | Schumann et al. |
| 6,114,467 | A * | 9/2000 | Ober et al. ............... 525/332.3 |
| 6,316,512 | B1 | 11/2001 | Bambara et al. |
| 6,465,547 | B1 | 10/2002 | Jackson et al. |
| 6,528,585 | B1 | 3/2003 | Standke et al. |
| 2004/0014895 | A1 * | 1/2004 | Farley et al. ............... 525/240 |
| 2004/0116602 | A1 | 6/2004 | Botros |
| 2004/0132854 | A1 * | 7/2004 | Du Plessis et al. ........ 522/114 |
| 2005/0049343 | A1 | 3/2005 | Borke et al. |
| 2006/0178487 | A1 | 8/2006 | Weller |
| 2007/0027250 | A1 | 2/2007 | Joseph et al. |
| 2008/0242801 | A1 | 10/2008 | Vigano et al. |

FOREIGN PATENT DOCUMENTS

| | | |
|---|---|---|
| EP | 1 354 912 | 10/2003 |
| GB | 2 181 437 | 4/1987 |
| WO | 98/21251 | 5/1998 |
| WO | 99/62690 | 12/1999 |
| WO | 2004/014971 | 2/2004 |
| WO | WO 2004014971 A1 * | 2/2004 |

OTHER PUBLICATIONS

Kurian et al. European Polymer Journal, vol. 28, No. 1, pp. 113-116, 1992.*
Snapshot of the Definition of Film from the Merriam Webster online dictionary 2010.*
Jiao, Chuanmei et al.; "Silane Grafting and Crosslinking of Ethylene-Octene Copolymer," European Polymer Journal, vol. 41, pp. 1204-1211, 2005.
Shieh, Yeong-Tarng et al.; "DSC and DMA Studies on Silane-Grafted and Water-Crosslinked LDPE/LLDPE Blends," Journal of Applied Polymer Science, vol. 81, pp. 1808-1616, 2001.
Sirisinha, Kalyanee et al.; "Changes in Properties of Silane-Water Crosslinked Metallocene Ethylene-Octene Copolymer After Prolonged Crosslinking Time," Journal of Applied Polymer Science, vol. 93, pp. 901-906, 2004.
Sirisinha, Kalyanee et al.; "Comparison in Processability and Mechanical and Thermal Properties of Ethylene-Octene Copolymer Crosslinked by Different Techniques," Journal of Applied Polymer Science, vol. 93, pp. 1179-1185, 2004.

* cited by examiner

*Primary Examiner* — Vasu Jagannathan
*Assistant Examiner* — Mark Kaucher
(74) *Attorney, Agent, or Firm* — Robert L. Abdon; Frank E. Reid

(57) ABSTRACT

The present invention relates to polymer blends comprising: (a) from 5 wt % to 95 wt % of a HDPE having a density from 0.941 g/cm$^3$ to 0.980 g/cm$^3$ and an $I_{22}$ of 10 dg/min or more; and (b) from 95 wt % to 5 wt % of a grafted mPE, which is a reaction product of (i) a mPE having a density from 0.860 g/cm$^3$ to 0.935 g/cm$^3$ and an $I_2$ from 0.7 dg/min to 5.0 dg/min, and (ii) a silicon-containing grafting component, wherein the blend exhibits a high-temperature creep after extrusion that is at least 20% lower than a blend of the HDPE and the mPE that has not been grafted with a silicon-containing grafting component. These blends can advantageously comprise at least one layer of a film, e.g., made via extrusion.

24 Claims, No Drawings

SILICON-CONTAINING ETHYLENE-BASED POLYMER BLENDS, METHODS FOR MAKING SAME, AND ARTICLES MADE THEREFROM

CROSS REFERENCE TO RELATED APPLICATION

This application claims priority to U.S. Provisional Patent Application No. 60/920,984, filed Mar. 30, 2007, the disclosures of which are incorporated herein by reference in its entirety.

FIELD OF THE INVENTION

The present invention is directed generally to blends of grafted or crosslinked metallocene-catalyzed ethylene-based polymers. More particularly, the invention provides compositions including a silane crosslinkable or crosslinked metallocene-catalyzed ethylene-based polymer or copolymer, blends thereof with a HDPE polymer, and the film applications thereof.

BACKGROUND OF THE INVENTION

A variety of polymeric materials are used in film applications. In particular, low density polyethylene (LDPE) produced by high pressure free radical polymerization, and linear low density polyethylene (LLDPE) produced by Ziegler-Natta-catalyzed polymerization, have been used, as well as high density polyethylene (HDPE) produced by a variety of polymerization methods. The lower density materials are typically crosslinked to improve various properties such as mechanical strength, processability, and resistance to high temperature degradation.

Crosslinked LDPE offers a number of advantages over crosslinked LLDPE. In particular, LDPE has better processability characteristics, such as lower melt fracture, higher melt strength, and reduced torque requirements in extrusion. However, uncrosslinked LLDPE can provide less than satisfactory film properties, unless processing aids are added. Indeed, even certain crosslinked LLDPEs can be insufficient for some film applications.

There remains a need in the art for grafted and crosslinked polymer compositions which combine the processability advantages of LDPEs and LLDPEs and the mechanical strength and other superior film properties of HDPEs.

SUMMARY OF THE INVENTION

In one embodiment, a polymer blend comprises: (a) from 5 wt % to 95 wt % of a HDPE having a density from 0.941 g/cm3 to 0.980 g/cm3 and an I22 of 10 dg/min or more; and (b) from 95 wt % to 5 wt % of a grafted mPE, which is a reaction product of (i) a mPE having a density from 0.860 g/cm3 to 0.935 g/cm3 and an I2 from 0.7 dg/min to 5.0 dg/min, and (ii) a silicon-containing grafting component, wherein the blend exhibits a high-temperature creep after extrusion that is at least 20% lower than a blend of the HDPE and the mPE that has not been grafted with a silicon-containing grafting component. The polymer blend is particularly suited to be included in at least one layer of a film, which can then be sealed to form a bag.

In another embodiment, a process for making films containing the polymer blends described herein comprises: contacting a mPE having a density from 0.860 g/cm3 to 0.935 g/cm3 and an I2 from 0.7 dg/min to 5.0 dg/min with a silicon-containing grafting component under conditions sufficient to form a grafted mPE; mixing the grafted mPE with a HDPE having a density from 0.941 g/cm3 to 0.980 g/cm3 and an I22 of 10 dg/min or more under conditions sufficient to form a polymer blend; and forming at least one layer of the film by extrusion, wherein the at least one layer comprises the polymer blend, wherein the at least one layer exhibits a high-temperature creep after extrusion that is at least 20% lower than a layer formed from a blend of the HDPE and the mPE that has not been grafted with a silicon-containing grafting component.

DETAILED DESCRIPTION OF THE PREFERRED EMBODIMENTS

One aspect of the invention relates to a polymer blend comprising: (a) from 5 wt % to 95 wt % of a HDPE having a density from 0.941 g/cm3 to 0.980 g/cm3 and an I22 of 10 dg/min or more; and (b) from 95 wt % to 5 wt % of a grafted mPE, which is a reaction product of (i) a mPE having a density from 0.860 g/cm3 to 0.935 g/cm3 and an I2 from 0.7 dg/min to 5.0 dg/min, and (ii) a silicon-containing grafting component, wherein the blend exhibits a high-temperature creep after extrusion that is at least 20% lower than a blend of the HDPE and the mPE that has not been grafted with a silicon-containing grafting component.

In a preferred embodiment, the polymer blend can comprise at least one layer of a film, which can then be sealed to form a bag.

Another aspect of the invention relates to a process for making films containing the polymer blends described herein, which process comprises: contacting a mPE having a density from 0.860 g/cm3 to 0.935 g/cm3 and an I2 from 0.7 dg/min to 5.0 dg/min with a silicon-containing grafting component under conditions sufficient to form a grafted mPE; mixing the grafted mPE with a HDPE having a density from 0.941 g/cm3 to 0.980 g/cm3 and an I22 of 10 dg/min or more under conditions sufficient to form a polymer blend; and forming at least one layer of the film by extrusion, wherein the at least one layer comprises the polymer blend, wherein the at least one layer exhibits a high-temperature creep after extrusion that is at least 20% lower than a layer formed from a blend of the HDPE and the mPE that has not been grafted with a silicon-containing grafting component.

Polyethylene Resins

Polyethylene resins (or ethylene-based polymers) suitable for the compositions described herein are either homopolymers of ethylene or copolymers of ethylene and at least one comonomer. Polymers having more than two types of monomers, such as terpolymers, are also included within the term "copolymer" as used herein. As used herein, a copolymer of ethylene and at least one comonomer indicates a polymer formed of more than 50 mol % polymerized ethylene units, and the remaining less than 50 mol % polymerized units being polymerized olefin comonomers, such as C3-C20 α-olefins or preferably C3-C12 α-olefins. The α-olefin comonomer can be linear or branched, and two or more comonomers can be used, if desired. Examples of suitable comonomers include linear C3-C12 α-olefins, and α-olefins having one or more C1-C3 alkyl branches, or an aryl group. Specific examples can include, but are not limited to, propylene; 1-butene, 3-methyl-1-butene; 3,3-dimethyl-1-butene; 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; 1-decene; 1-decene with one or more methyl, ethyl, or propyl substituents; 1-dodecene; styrene; α-methylstyrene; and styrene with one or more methyl, ethyl, or propyl substituents. It should be appreciated that the list of comonomers above is merely exemplary, and is not intended to be limiting. Preferred comonomers include, but are not limited to, propylene, 1-butene, 1-pentene, 4-methyl-1-pentene, 1-hexene, 1-octene, and 1-decene. Alternately or additionally, suitable comonomers can include polar vinyl monomers such as acrylic acid and/or its salts (e.g., inorganic such as sodium, potassium, lithium, calcium, magnesium, aluminum, copper, nickel, iron, and the like; organic such as ammonium, mono-, di-, tri-, or tetra-alkylammonium, and the like; or a combination thereof), alkacrylic acids (e.g., methacrylic acid, ethacrylic acid, and the like) and/or its salts, alkyl acrylates (e.g., methyl acrylate, ethyl acrylate, n-propyl acrylate, isopropyl acrylate, n-butyl acrylate, isobutyl acrylate, and the like), alkacrylates (e.g., methacrylate, ethacrylate, and the like), alkyl alkacrylates (e.g., methyl methacrylate, ethyl methacrylate, methyl isobutylacrylate, and the like), vinyl acetate, anhydrides (e.g., maleic anhydride, crotonic anhydride, and the like), and the like, and combinations thereof.

Other useful comonomers can include polar vinyl, conjugated, and non-conjugated dienes, acetylene, and aldehyde monomers, which can be included in minor amounts in terpolymer compositions. Non-conjugated dienes useful as comonomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyltetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB). Note that throughout this description the terms "non-conjugated diene" and "diene" are used interchangeably.

It should be appreciated that the amount of comonomer used can depend upon the desired density of the ethylene-based copolymer and the specific comonomers selected. For a given comonomer, the density of the polyethylene copolymer produced therefrom typically decreases as the comonomer content increases. For each specific comonomer, one skilled in the art should be able to determine the comonomer content appropriate to produce a copolymer having a desired density.

In general, suitable polyethylene resins can be produced using a gas-phase metallocene-catalyzed polymerization process in a fluidized-bed reactor. Further details of the catalysts and process are given below.

In some embodiments, polyethylene resin(s) suitable for use in the compositions of the present invention is(are) described in U.S. Pat. No. 6,255,426, the disclosure of which is fully incorporated by reference herein.

In one embodiment, the ungrafted mPE can have a density from 0.900 g/cm3 to 0.935 g/cm3. Accordingly, in one embodiment, the ungrafted mPE can be a mLLDPE; in another embodiment, the ungrafted mPE can be a mVLDPE.

In another embodiment, the mPE can have a density from 0.912 g/cm3 to 0.932 g/cm3, an I2 from 0.9 dg/min to 3.5 dg/min, or both.

In another embodiment, the mPE can have a density from 0.916 g/cm3 to 0.935 g/cm3, an I2 from 2.1 dg/min to 4.0 dg/min, or both.

In another embodiment, the mPE can have a density from 0.900 g/cm3 to 0.915 g/cm3, an I2 from 2.1 dg/min to 3.6 dg/min, or both.

In another embodiment, the mPE can have a density from 0.870 g/cm3 to 0.915 g/cm3, an I2 from 0.7 dg/min to 3.9 dg/min, or both.

In one embodiment, the mPE can have one or more of the following properties, with ranges from any lower limit to any upper limit being contemplated: (a) a composition distribution breadth index ("CDBI") of at least 70% or at least 75% or at least 80%; (b) a melt index I2 from a lower limit of 0.1 or 0.3 dg/min to an upper limit of 10 or 15 dg/min; (c) a density from a lower limit of 0.910 or 0.916 or 0.918 g/cm3 to an upper limit of 0.940 or 0.935 or 0.930 or 0.927 g/cm3; (d) a melt index ratio I22/I2 from a lower limit of 30 or 35 to an upper limit of 80 or 60; and (e) an Mw/Mn ratio from a lower limit of 2.5 or 2.8 or 3.0 or 3.2 to an upper limit of 5.5 or 4.5 or 4.0 or 3.8.

In some embodiments, all of the characteristics (a)-(e) can describe the mPE, with any of the combinations of lower and/or upper limits recited. Thus, for example, in one embodiment, the mPE has a CDBI of at least 70%, a melt index I2 from 0.1 to 15 dg/min, a density from 0.910 to 0.940 g/cm3, a melt index ratio I22/I2 from 30 to 80, and an Mw/Mn ratio from 2.5 to 5.5. In another embodiment, the mPE has a CDBI of at least 75%, a melt index I2 from 0.1 to 15 dg/min, a density from 0.910 to 0.940 g/cm3, a melt index ratio I22/I2 from 30 to 80, and an Mw/Mn ratio from 2.5 to 5.5. In another embodiment, the mPE has a CDBI of at least 80%, a melt index I2 from 0.1 to 15 dg/min, a density from 0.910 to 0.940 g/cm3, a melt index ratio I22/I2 from 30 to 80, and an Mw/Mn ratio from 2.5 to 5.5. In another embodiment, the mPE has the properties of any of the embodiments above, except that the melt index I2 is from 0.1 to 10 dg/min, from 0.3 to 15 dg/min, or from 0.3 to 10 dg/min. In another embodiment, the mPE has the properties of any of the embodiments above, except that the density is from 0.910 to 0.935 g/cm3, from 0.910 to 0.930 g/cm3, from 0.910 to 0.927 g/cm3, from 0.916 to 0.940 g/cm3, from 0.916 to 0.935 g/cm3, from 0.916 to 0.930 g/cm3, from 0.916 to 0.927 g/cm3, from 0.918 to 0.940 g/cm3, from 0.918 to 0.935 g/cm3, from 0.918 to 0.930 g/cm3, or from 0.918 to 0.927 g/cm3. In another embodiment, the mPE has the properties of any of the embodiments above, except that the melt index ratio I22/I2 is from 30 to 60, from 35 to 80, or from 35 to 60. In another embodiment, the mPE has the properties of any of the embodiments above, except that the Mw/Mn ratio is from 2.5 to 4.5, from 2.5 to 4.0, from 2.5 to 3.8, from 2.8 to 5.0, from 2.8 to 4.5, from 2.8 to 4.0, from 2.8 to 3.8, from 3.0 to 5.5, from 3.0 to 4.5, from 3.0 to 4.0, from 3.0 to 3.8, from 3.2 to 5.5, from 3.2 to 4.5, from 3.2 to 4.0, or from 3.2 to 3.8.

In embodiments according to the invention where the mPE component is mixed with a second polymer component to form a polymer blend, the nature of the second polymer component may depend on the specific purpose of the polymer blend (e.g., the ultimate end use). In one embodiment, the second polymer component is an HDPE. In a variation of that embodiment, the HDPE has a density from 0.951 g/cm3 to 0.964 g/cm3, an I22 from 14 dg/min to 60 dg/min, or both. In another variation of that embodiment, the HDPE has a density from 0.942 g/cm3 to 0.962 g/cm3, an I22 from 15 dg/min to 50 dg/min, or both.

Also, depending on the specific purpose of the polymer blend, the relative amounts of both the mPE and the second polymer component can be varied. In one embodiment, the HDPE comprises 50 wt % to 95 wt % of the blend, and the grafted mPE comprises 5 wt % to 50 wt % of the blend. In another embodiment, the HDPE comprises 65 wt % to 85 wt % of the blend, and the grafted mPE comprises 15 wt % to 35 wt % of the blend.

When the relative amounts of the mPE and the HDPE components of the polymer composition are described, as above, the wt % values "of the blend" should be understood to reflect the percent of the combined weight of the grafted and at least partially crosslinked mLLDPE and the HDPE, which typically includes any additive components present in each polymer resin prior to blending, but which typically does not include post-blending additives, processing aids, etc.

In addition to the properties recited above, the polymer compositions (blends) can be characterized in terms of its properties in monolayer films. Such properties do not limit the compositions to monolayer film applications, but provide a further means of distinguishing the compositions from other resins that may have similar bulk properties, but more subtle and significant distinctions evident in monolayer films formed comprising the resins/compositions.

In another embodiment, the polymer composition can further be characterized in that a monolayer film formed therefrom can have an averaged tensile modulus M from 20000 psi (14000 N/cm2) to 60000 psi (41000 N/cm2), where M is the arithmetic mean of the machine direction and transverse direction 1% secant moduli, as determined according to ASTM D-882-97.

In another embodiment, the polymer composition can further be characterized in that a monolayer film formed therefrom can have a Dart Impact Strength from 120 to 1000 g/mil (4.7 to 40 g/μm), from 120 to 800 g/mil (4.7 to 32 g/μm), from 150 to 1000 g/mil (5.9 to 40 g/μm), or from 150 to 800 g/mil (5.9 to 32 g/μm).

In another embodiment, the polymer composition can be characterized in that a monolayer film formed therefrom can exhibit a high-temperature creep that is at least 40%, or even at least 50%, lower than a blend of the HDPE and the mPE that has not been grafted with the silicon-containing grafting component.

In another embodiment, the polymer composition can be characterized in that a monolayer film formed therefrom can exhibit exhibits a die shrinkage that is at least 10%, at least 15%, or at least 20%, lower than a blend of the HDPE and the mPE that has not been grafted with the silicon-containing grafting component.

Catalysts for Producing Polyethylene Resins

The terms "metallocene" and "metallocene catalyst precursor" as used herein mean compounds having a transition metal (M), e.g., from Group 4, 5, or 6 of the Periodic Table of Elements, with a cyclopentadienyl (Cp) ligand or ligands which may be substituted, at least one non-cyclopentadienyl-derived ligand (X), and zero or one heteroatom-containing ligand (Y), the ligands being coordinated to M and corresponding in number to the valence thereof. The metallocene catalyst precursors generally require activation with a suitable co-catalyst (referred to as an "activator"), in order to yield an "active metallocene catalyst," i.e., an organometallic complex with a vacant coordination site that can coordinate, insert, and polymerize olefins. In general, a metallocene catalyst precursor can be one of, or a mixture of, metallocene compounds of either or both of the following types:

(1) Biscyclopentadienyl complexes which have two Cp ring systems for ligands. The Cp ligands can form a sandwich complex with the metal and can be free to rotate (unbridged) or locked into a rigid configuration through a bridging group. The Cp ring ligands can be like or unlike, unsubstituted, substituted, or a derivative thereof, such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula

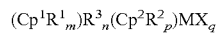

wherein: $Cp^1$ and $Cp^2$ are the same or different cyclopentadienyl rings; $R^1$ and $R^2$ are each, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; two $R^1$ and/or $R^2$ substituents on adjacent carbon atoms of the cyclopentadienyl ring associated therewith can be joined together to form a ring containing from 4 to about 20 carbon atoms; $R^3$ is a bridging group; n is the number of atoms in the direct chain between the two ligands and is 0 to 8, preferably 0 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; and q is equal to the valence of M−2.

(2) Monocyclopentadienyl complexes which have only one Cp ring system as a ligand. The Cp ligand can form a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom-containing ligand is typically bound to the metal and optionally to the Cp ligand through the bridging group. The heteroatom itself is an atom with a coordination number of three from Group 15 or with a coordination number of two from Group 16 of the Periodic Table of Elements. These monocyclopentadienyl complexes have the general formula

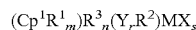

wherein: each $R^1$ is independently, a halogen or a hydrocarbyl, halocarbyl, hydrocarbyl-substituted organometalloid or halocarbyl-substituted organometalloid group containing up to about 20 carbon atoms, "m" is 0 to 5, and two $R^1$ substituents on adjacent carbon atoms of the cyclopentadienyl ring associated there with can be joined together to form a ring containing from 4 to about 20 carbon atoms; $R^3$ is a bridging group; "n" is 0 to 3; M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group 15 or a coordination number of two from Group 16, preferably nitrogen, phosphorous, oxygen, or sulfur; $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R^2$ groups on Y each independently a radical selected from the group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M−2.

Preferred metallocenes include biscyclopentadienyl compounds, more preferably bridged by a bridging group including a single carbon, germanium, or silicon atom.

Illustrative, but not limiting, examples of suitable biscyclopentadienyl metallocenes of the type described in group (1) above can include the racemic isomers of: μ-(CH3)2Si(indenyl)2M(Cl)2; μ-(CH3)2Si(indenyl)2M(CH3)2; μ-(CH3)2Si(tetrahydroindenyl)2M(Cl)2; μ-(CH3)2Si(tetrahydroindenyl)2M(CH3)2; μ-(CH3)2Si(indenyl)2 M(CH2CH3)2; and μ-(C6H5)2C(indenyl)2M(CH3)2, wherein M is Zr or Hf.

Additionally or alternately, examples of suitable unsymmetrical cyclopentadienyl metallocenes of the type described in group (1) above are disclosed in U.S. Pat. Nos. 4,892,851; 5,334,677; 5,416,228; and 5,449,651; and in the publication J. Am. Chem. Soc. 1988, 110, 6255.

Illustrative, but not limiting, examples of preferred unsymmetrical cyclopentadienyl metallocenes of the type described in group (1) above can include: μ-(C6H5)2C(cyclopentadienyl)(fluorenyl)M(R)2; μ-(C6H5)2C(3-methylcyclopentadienyl) (fluorenyl)M(R)2; μ-(CH3)2C(cyclopentadienyl)(fluorenyl) M(R)2; μ-(C6H5)2C(cyclopentadienyl)(2-methylindenyl)M(CH3)2; μ-(C6H5)2C(3-methylcyclopentadienyl)(2-methylindenyl)M(Cl)2; μ-(C6H5)2C(cyclopentadienyl)(2,7-dimethylfluorenyl)M (R)2; and μ-(CH3)2C(cyclopentadienyl)(2,7-dimethylfluorenyl) M(R)2, wherein M is Zr or Hf, and R is Cl or CH3.

Additionally or alternately, examples of monocyclopentadienyl metallocenes of the type described in group (2) above are disclosed in U.S. Pat. Nos. 5,026,798; 5,057,475; 5,350,723; 5,264,405; and 5,055,438; and in International Publication No. WO 96/002244.

While Ziegler-Natta (Z/N) type catalysts are capable of being used to form ethylene-based polymers similar to those formed using metallocene catalysts, it is preferred that the lower density polymer component in the blend be made using a metallocene catalyst. Nevertheless, in some embodiments, the mPE can alternately be a Z/N PE polymer or copolymer. Regarding the second polymer component (HDPE) of the polymer blend, it can be made using metallocene and/or Ziegler-Natta catalysts.

The metallocene compounds are contacted with an activator to produce an active catalyst. One class of activators is noncoordinating anions, where the term "noncoordinating anion" (NCA) means an anion which either does not coordinate to the transition metal cation or which is only weakly coordinated to the transition metal cation, thereby remaining sufficiently labile to be displaced by a neutral Lewis base. "Compatible" noncoordinating anions are those which are not degraded to neutrality when the initially formed complex decomposes. Further, the anion will typically not transfer an anionic substituent or fragment to the cation, so as to cause it to form a neutral four coordinate metallocene compound and a neutral by-product from the anion. Noncoordinating anions (NCAs) useful in accordance with this invention are those which are compatible, stabilize the metallocene cation in the sense of balancing its ionic charge in a+1 state, and yet retain sufficient lability to permit displacement by an ethylenically or acetylenically unsaturated monomer during polymerization. Additionally, the anions useful in this invention are typically large or bulky in the sense of sufficient molecular size to largely inhibit or prevent neutralization of the metallocene cation by Lewis bases other than the polymerizable monomers that may be present in the polymerization process. Typically, the anion can have a molecular size of greater than or equal to about 4 angstroms. Non-limiting examples of noncoordinating anions can be found in European Publication No. EP 277 004.

An additional method of making metallocene catalysts uses ionizing anionic precursors which are initially neutral Lewis acids but which form the cation and anion upon ionizing reaction with the metallocene compounds. For example, tris(pentafluorophenyl) boron acts to abstract an alkyl, hydride, or silyl ligand from the metallocene compound to yield a metallocene cation and a stabilizing non-coordinating anion; see, EP-A-0 427 697 and EP-A-0 520 732. Metallocene catalysts for addition polymerization can also be prepared by oxidation of the metal centers of transition metal compounds by anionic precursors containing metallic oxidizing groups along with the anion groups; see EP-A-0 495 375.

Examples of suitable activators capable of ionic cationization of the metallocene compounds of the invention, and consequent stabilization with a resulting NCA, can include, but are not limited to: trialkyl-substituted ammonium salts (such as triethylammonium tetraphenylborate, tripropylammonium tetraphenylborate, tri(n-butyl) ammonium tetraphenylborate, trimethylammonium tetrakis(p-tolyl)borate, trimethyl-ammonium tetrakis(o-tolyl)borate, tributylammonium tetrakis(pentafluorophenyl)borate, tripropylammonium tetrakis(o,p-dimethylphenyl)borate, tributylammonium tetrakis (m,m-dimethylphenyl)borate, tributylammonium tetrakis(p-trifluoromethylphenyl)borate, tributylammonium tetrakis (pentafluorophenyl)borate, tri(n-butyl)ammonium tetrakis (o-tolyl)borate, and the like, and combinations thereof); N,N-dialkyl anilinium salts (such as N,N-dimethylanilinium tetrakis(pentafluorophenyl)borate, N,N-dimethylanilinium tetrakis(heptafluoronaphthyl)borate, N,N-dimethylanilinium tetrakis(perfluoro-4-biphenyl)borate, N,N-dimethylanilinium tetraphenylborate, N,N-diethylanilinium tetraphenylborate, N,N-2,4,6-pentamethylanilinium tetraphenylborate and the like, and combinations thereof); dialkyl ammonium salts (such as di(isopropyl)ammonium tetrakis (pentafluorophenyl)borate, dicyclohexylammonium tetraphenylborate, and the like, and combinations thereof); and triaryl phosphonium salts (such as triphenyl-phosphonium tetraphenylborate, tri(methylphenyl)phosphonium tetraphenylborate, tri(dimethylphenyl)phosphonium tetraphenylborate, and the like, and combinations thereof).

Further examples of suitable anionic precursors include those including a stable carbonium ion, and a compatible non-coordinating anion. These include: tropillium tetrakis (pentafluorophenyl)borate; triphenylmethylium tetrakis(pentafluorophenyl)borate; benzene (diazonium) tetrakis(pentafluorophenyl)borate; tropillium phenyltris(pentafluorophenyl)borate; triphenylmethylium phenyl-(trispentafluorophenyl)borate; benzene (diazonium) phenyl-tris(pentafluorophenyl)borate; tropillium tetrakis (2,3,5,6-tetrafluorophenyl)borate; triphenylmethylium tetrakis(2,3,5,6-tetrafluoro-phenyl)borate; benzene (diazonium) tetrakis(3,4,5-trifluorophenyl)borate; tropillium tetrakis(3,4,5-trifluorophenyl)borate; benzene (diazonium) tetrakis(3,4,5-trifluoro-phenyl)borate; tropillium tetrakis(3,4,5-trifluorophenyl)aluminate; triphenylmethylium tetrakis(3,4,5-trifluorophenyl)aluminate; benzene (diazonium) tetrakis(3,4,5-trifluorophenyl)aluminate; tropillium tetrakis(1,2,2-trifluoroethenyl)borate; triphenylmethylium tetrakis(1,2,2-trifluoroethenyl)borate; benzene (diazonium) tetrakis(1,2,2-trifluoroethenyl)borate; tropillium tetrakis(2,3,4,5-tetrafluorophenyl)borate; triphenylmethylium tetrakis(2,3,4,5-tetrafluorophenyl)borate; benzene (diazonium) tetrakis(2,3,4,5-tetrafluorophenyl)borate, and the like, and combinations thereof.

Where the metal ligands include halide moieties, for example, (methyl-phenyl) silylene(tetra-methyl-cyclopenta-dienyl)(tert-butyl-amido) zirconium dichloride), which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944, EP-A1-0 570 982, and EP-A1-0 612 768, the disclosures of all of which are fully incorporated herein by reference, for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also typically suitable as a scavenger (as described below), its use in excess of that normally stoichiometrically required for alkylation of the metallocene can permit its addition to the reaction solvent with the metallocene compound. Normally, alumoxane would not be added with the metallocene, so as to avoid premature activation, but can be added directly to the reaction vessel in the presence of the polymerizable monomers when serving as both scavenger and alkylating activator.

Alkylalumoxanes are additionally suitable as catalyst activators, particularly for those metallocenes having halide ligands. An alumoxane useful as a catalyst activator typically is an oligomeric aluminum compound represented by the general formula (R—Al—O)n, which is a cyclic compound, or R(R—Al—O)nAlR2, which is a linear compound. In these formulae, each R or R2 is a C1 to C5 alkyl radical, for example, methyl, ethyl, propyl, butyl or pentyl, and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Optionally, a scavenging compound is also used. The term "scavenging compound," as used herein, refers to those compounds effective for removing polar impurities from the reaction solvent. Such impurities can be inadvertently introduced with any of the polymerization reaction components, particularly with solvent, monomer, and comonomer feed, and can adversely affect catalyst activity and stability, e.g., by decreasing or even eliminating catalytic activity, particularly when a metallocene cation-NCA pair comprises the catalyst system. The polar impurities, or catalyst poisons, can include water, oxygen, oxygenated hydrocarbons, metal impurities, etc. Preferably, steps are taken before provision of such into the reaction vessel, for example, by chemical treatment or careful separation techniques after or during the synthesis or preparation of the various components, but some minor amounts of scavenging compound will still normally be required in the polymerization process itself. Typically, the scavenging compound will be an organometallic compound such as the Group 13 organometallic compounds of U.S. Pat. Nos. 5,153,157 and 5,241,025; European Publication No. EP-A-0 426 638; and International Publication Nos. WO-A-91/09882, WO-A-94/03506, and WO-A-93/14132, the disclosures of all of which are fully incorporated herein by reference. Exemplary compounds include, but are not limited to, triethyl aluminum, triethyl borane, triisobutyl aluminum, isobutyl aluminumoxane, and those other compounds having bulky substituents covalently bound to the metal or metalloid center, which preferably minimize adverse interaction with the active catalyst.

Preferably, no scavenging compounds are used, and the reaction is carried out under conditions of substantially no scavengers. The terms "substantially no scavengers" and "substantial devoid or free of Lewis acid scavengers," as used herein, indicate less than 100 ppm by weight of such scavengers present in the feed gas to the reactor, or preferably, no intentionally added scavenger, e.g., an aluminum alkyl scavenger, other than that which may be present on the support.

Preferably the catalyst is substantially devoid of non-bridged metallocene compounds; i.e., no such metallocene is intentionally added to the catalyst, or preferably, no such metallocene can be identified in such catalyst. Preferred catalysts can include compounds including a pair of pi-bonded ligands (such as cyclopentadienyl ligands), at least one of which typically has a structure with at least two cyclic fused rings, such as indenyl rings. In a particular embodiment, the metallocene is a substantially single metallocene species including a monoatom silicon bridge connecting two polynuclear ligands pi-bonded to the transition metal atom. A particular example of such a bridged metallocene compound is dimethylsilyl-bis(tetrahydroindenyl) zirconium dichloride, also denoted as (CH3)2Si(H4Ind)2ZrCl2, where the term "H4Ind" indicates tetrahydroindenyl.

The catalyst is preferably supported on silica with the catalyst homogeneously distributed in the silica pores. Preferably, fairly small amounts of methyl alumoxane should be used, such as amounts giving an Al to transition metal molar ratio from 400 to 30 or from 200 to 50.

Processes for Producing Polyethylene Resins

Suitable processes for producing polyethylene resins are well known in the art. A preferred process is a steady-state polymerization process, such as in a gas-phase fluidized-bed reactor.

Gas phase processes for the homopolymerization and copolymerization of monomers, especially olefin monomers, are well known in the art. Such processes can be conducted, for example, by introducing the gaseous monomer or monomers into a stirred and/or fluidized bed of resin particles and catalyst.

In the fluidized-bed polymerization of olefins, the polymerization is conducted in a fluidized-bed reactor, wherein a bed of polymer particles is maintained in a fluidized state, e.g., by means of an ascending gas stream including gaseous reaction monomer. The polymerization of olefins in a stirred-bed reactor differs from polymerization in a gas fluidized-bed reactor by the action of a mechanical stirrer within the reaction zone, which contributes to fluidization of the bed. As used herein, the term "fluidized-bed" also includes stirred-bed processes and reactors.

The start-up of a fluidized bed reactor generally uses a bed of pre-formed polymer particles. During the course of polymerization, fresh polymer is generated by the catalytic polymerization of the monomer, and polymer product is withdrawn to maintain the bed at constant volume. An industrially favored process employs a fluidization grid to distribute the fluidizing gas to the bed, and also to act as a support for the bed when the supply of gas is cut off. The polymer produced is generally withdrawn from the reactor via one or more discharge conduits disposed in the lower portion of the reactor, near the fluidization grid. The fluidized bed can include a bed of growing polymer particles, polymer product particles, and catalyst particles. This reaction mixture can be maintained in a fluidized condition by the continuous upward flow from the base of the reactor of a fluidizing gas, which includes recycle gas drawn from the top of the reactor, together with added make-up monomer.

The fluidizing gas can enter the bottom of the reactor and can preferably be passed through a fluidization grid, typically upwardly through the fluidized bed.

The polymerization of olefins is an exothermic reaction, and it is therefore generally necessary to cool the bed to remove the heat of polymerization. In the absence of such cooling, the bed typically increases in temperature until, for example, the catalyst becomes inactive or the polymer particles melt and begin to fuse.

In the fluidized-bed polymerization of olefins, a typical method for removing the heat of polymerization includes passing a cooling gas, such as the fluidizing gas, which is typically at a temperature lower than the desired polymerization temperature, through the fluidized bed to conduct away the heat of polymerization. The gas can be removed from the reactor, cooled by passage through an external heat exchanger, and then recycled to the bed.

The temperature of the recycle gas can be adjusted in the heat exchanger to maintain the fluidized-bed at the desired polymerization temperature. In this method of polymerizing alpha olefins, the recycle gas generally includes one or more monomeric olefins, optionally together with, for example, an inert diluent gas or a gaseous chain transfer agent such as hydrogen. The recycle gas thus serves to supply monomer to the bed to fluidize the bed and to maintain the bed within a desired temperature range. Monomers consumed by conversion into polymer in the course of the polymerization reaction are normally replaced by adding make-up monomer to the recycle gas stream.

The material exiting the reactor includes the polyolefin and a recycle stream containing unreacted monomer gases. Following polymerization, the polymer is recovered. If desired, the recycle stream can be compressed and cooled, and mixed with feed components, whereupon a gas phase and a liquid phase are then returned to the reactor.

A variety of gas phase polymerization processes are known. For example, the recycle stream can be cooled to a temperature below the dew point, resulting in condensing a portion of the recycle stream, as described in U.S. Pat. Nos. 4,543,399 and 4,588,790, the disclosures of both of which are fully incorporated herein by reference. This intentional introduction of a liquid into a recycle stream or reactor during the process is referred to generally as a "condensed mode" operation.

Further details of fluidized bed reactors and their operation are disclosed in, for example, U.S. Pat. Nos. 4,243,619, 4,543,399, 5,352,749, 5,436,304, 5,405,922, 5,462,999, and 6,218,484, the disclosures of which are fully incorporated herein by reference. Suitable process conditions can be determined by one skilled in the art, and are described in International Publication No. WO 96/08520 and in U.S. Pat. Nos. 5,763,543 and 6,255,426, the disclosures of which are fully incorporated herein by reference.

In a specific embodiment, a mPE can be produced by continuously circulating a feed gas stream containing monomer and inerts to thereby fluidize and agitate a bed of polymer particles, adding metallocene catalyst to the bed and removing polymer particles, wherein the catalyst includes at least one bridged bis-cyclopentadienyl transition metal and an alumoxane activator on a common or separate porous support; in this embodiment, the feed gas can be substantially devoid of a Lewis acidic scavenger, and any Lewis acidic scavenger can be present in an amount less than 100 ppmw of the feed gas; also in this embodiment, the temperature in the fluidized-bed can be no more than 20° C. less than the polymer melting temperature, as determined by DSC, at an ethylene partial pressure in excess of 60 psia (410 kpaa); further in this embodiment, the removed polymer particles can have an ash content of transition metal of less than 500 ppmw, the polymer melt index I2 can be less than 10, the MIR at least 35, and the polymer can have substantially no detectable chain end unsaturation, as determined by proton nuclear magnetic resonance (1H NMR).

As used herein, "substantially no detectable end chain unsaturation" means that the polymer has vinyl unsaturation of less than 0.1 vinyl groups per 1000 carbon atoms in the polymer, or less than 0.05 vinyl groups per 1000 carbon atoms, or less than 0.01 vinyl groups per 1000 carbon atoms.

Silane Crosslinking

The mPE compositions according to the invention can be crosslinked by a reactive silane compound, though, in certain applications, the mPE compositions may be only grafted with the reactive silane compound and not crosslinked. Silane crosslinking processes well known in the art include the commercially available MONOSIL™ process, developed by Maillefer and BICC, and the SIOPLAS™ process developed by Dow Corning. In the SIOPLAS™, or "two-step" process, a polyethylene is first graft-modified in a compounding mixer or extruder with a reactive silane compound and a free radical initiator to produce a silane-grafted polyethylene that can be pelletized and shipped or stored for subsequent processing. The silane-grafted polyethylene can then be compounded with a silanol condensation catalyst and melt-extruded in the desired form, such as a pipe or a wire coating layer, followed by curing (crosslinking) by heat and moisture, such as in a water bath or a steam bath. In warm and humid climates, curing can take place under ambient conditions. In the MONOSIL™ or "one-step" process, the polyethylene, reactive silane compound, free radical initiator and silanol condensation catalyst are all fed into an extruder and melt extruded in a desired form, such as a pipe or a wire coating layer, followed by curing by heat and moisture, as in the two-step process.

The reactive silane compound can be an unsaturated silane compound having one or more hydrolyzable groups. Typical reactive silane compounds include, but are not limited to, an alkenyl group such as vinyl, allyl, isopropenyl, butenyl, cyclohexenyl, or γ-(meth)acryloxy allyl, and a hydrolyzable group such as a hydrocarbyloxy, hydrocarbonyloxy or hydrocarbylamino group. Specific examples of hydrolyzable groups can include methoxy, ethoxy, formyloxy, acetoxy, propionyloxy, and alkylamino or acrylamino groups. A suitable reactive silane is vinyl trimethoxysilane, available as SILQUEST™ from OSi Specialties. The amount of silane used can readily be determined by one skilled in the art, based on the processing conditions, the specific silane used, and other well known factors. Typical amounts of silane compound can be from about 0.5 to about 5 phr, where the unit "phr" denotes parts by weight per hundred parts by weight of the mPE component.

The free radical initiator can be a peroxide or azo compound, which typically decomposes to form peroxyl or azyl radicals at temperatures suitable for polyethylene pelletization, or can be ionizing radiation. Typical peroxides include, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2, 5-di(t-butyl peroxy)hexane, lauryl peroxide and tert-butyl peracetate. A suitable azo compound is azobisisobutyl nitrite. A particular peroxide compound is dicumyl peroxide, available commercially as DI-CUPTMR from Hercules. The amount of free radical initiator can be readily determined by one skilled in the art, and can typically be from about 0.04 to about 0.15 phr.

The silanol condensation catalyst can be any compound that promotes the condensation crosslinking reaction, such as organic bases, carboxylic acids, and organometallic compounds including organic titanates and complexes or carboxylates of lead, cobalt, iron, nickel, zinc, or tin. Specific catalysts include, for example, dibutyl tin dilaurate, dioctyl tin maleate, dibutyl tin diacetate, dibutyl tin dioctoate, dibutyl tin didodecanoate, stannous acetate, stannous octoate, lead naphthenate, zinc caprylate, and cobalt naphthenate, inter alia. A particular tin carboxylate is dibutyl tin didodecanoate, available commercially as STANCLERETMTL from Akzo Chemie. Another particular tin catalyst is dibutyl tin dilaurate. The catalyst is typically used in a catalytically effective amount, which can readily be determined by one skilled in the art. Typical catalyst amounts can be from about 0.005 to about 0.1 phr, from about 0.005 to about 0.05 phr, or from about 0.01 to about 0.1 phr.

The peroxide-initiated reaction of vinyl trimethoxysilane and an ethylene-based polymer typically yields a grafted polymer having an ethylene-based polymer backbone structure with pendant ethyltrimethoxysilyl moieties. In the crosslinking reaction, methoxy groups can be hydrolyzed to form methanol and pendant ethyldimethoxy-silanolyl groups, which can undergo condensation reactions with other ethyldimethoxy-silanolyl groups to eliminate water and to form an Si—O—Si linkage between the pendant silyl moieties.

In one embodiment where the grafted mPE is at least partially crosslinked, the gel level can advantageously be at least 10%. In another embodiment where the grafted mPE is at least partially crosslinked, the gel level can advantageously be less than 70%.

Applications

In one embodiment, the mPE according to the invention, or a polymer blend comprising the mPE according to the invention, can comprise at least one layer of a film. In one embodiment, the film comprises only a monolayer; in another embodiment, the film comprises two polymeric layers, only one of which is comprised of the mPE and/or the polymer blend according to the invention. In another embodiment, the film comprises no more than three polymeric layers. In embodiments where the film comprises three layers, at least the middle layer preferably comprises the mPE and/or the polymer blend according to the invention.

In another embodiment, the mPE according to the invention, or a polymer blend comprising the mPE according to the invention, can form at least a portion of an electrical devices. Examples of such electrical devices can include, but are not limited to, power cables, telecommunications cables, data transmission cables, and combinations thereof.

In any of the embodiments herein, the silane crosslinkable or silane crosslinked mPEs can essentially comprise neat resin, or can further include conventional additives, such as antioxidants, pH adjusters, lubricants/surface-active additives, fillers, processing co-adjuvants, pigments, water-tree retardant additives. Further contemplated are mPE polymer blends, such as with polyolefin homopolymers or copolymers, olefin-ester copolymers, polyesters, polyethers, polyether-polyester copolymers, and mixtures thereof. Specific examples of polymers that can be included in such polymer blends/mixtures can include, but are not limited to, polyethylenes, polypropylenes, propylene-ethylene thermoplastic copolymers, ethylene-propylene rubbers, ethylene-propylene-diene rubbers, natural rubbers, butyl rubbers, ethylene-vinyl acetate (EVA) copolymers, ethylene-alkyl acrylate copolymers (e.g., where the alkyl is methyl, ethyl, butyl, or the like, or a combination thereof), ethylene-alkacrylate copolymers (e.g., where the alk is meth, eth, or the like, or a combination thereof), ethylene-alkyl alkacrylate copolymers (e.g., where alkyl and alk are as described previously), and ethylene-alpha-olefin copolymers.

Typical surface-active additives can include, but are not limited to, surface-active polymers, the repeat unit of which can advantageously comprises at least one halogen (e.g., fluorine, chlorine, bromine, etc.). Lower molecular weight lubricants may also be added to assist in processing of the polymer blends according to the invention.

Typical antioxidants can include, for example, polymerized trimethyldihydro-quinoline, 4,4'-thiobis(3-methyl-6-tert-butyl)phenol; pentaerythryl-tetra[3-(3,5-di-tert-butyl-4-hydroxyphenyl)propionate], and 2,2'-thiodiethylene-bis[3-(3,5-di-tert-butyl-4-hydroxyphenyl)propionate].

Additionally or alternately, the antioxidant(s) can include, but are not limited to, phosphorus-containing antioxidants (e.g., tri-substituted phosphites such as tris(nonylphenyl)phosphite; tri-substituted phosphine oxides such as triphenyl-phsophine oxide; and the like; and combinations thereof, where the each of the substitutions can individually be alkyl, aryl, or aralkyl), phenolic antioxidants which are typically hindered phenols (e.g., phenols having alkyl substitutions at the two ring positions ortho to the hydroxyl, where the alkyls are typically bulky such as isopropyl and/or t-butyl but can also be branched or linear C1-C6 alkyls, which phenols are also optionally substituted at the ring positions meta- and/or para- to the hydroxyl with branched or linear C1-C6 alkyls; if polymeric, one or more of the substitutions, even at the ortho-positions, can include the polymer backbone), and the like, and combinations thereof.

Typical pH adjusters can include, but are not limited to, acid scavengers such as transitional metal oxides (e.g., zinc oxides such as ZnO). Compounds that are pH adjusters may alternately be characterized as fillers, though the purpose may be different.

Suitable fillers can include, but are not limited to, inorganic oxides, or inorganic oxides in hydrate or hydroxide form. Examples include oxides or hydroxides of aluminum, bismuth, cobalt, iron, magnesium, titanium, and zinc, and the corresponding hydrate forms. Hydroxides can generally be used in the form of coated particles, wherein the coating is typically a saturated or unsaturated C8 to C24 fatty acid or a salt thereof, such as, e.g., oleic acid, palmitic acid, stearic acid, isostearic acid, lauric acid, magnesium stearate, magnesium oleate, zinc stearate, or zinc oleate. Other suitable fillers can include, but are not limited to, glass particles, glass fibers, calcined kaolin, and talc.

Typical processing co-adjuvants, if present, can include, but are not limited to, calcium stearate, zinc stearate, stearic acid, paraffin wax, and the like, and combinations thereof.

Materials and Methods

Tensile strength values (tensile yield, ultimate tensile strength, elongation at break and elongation at yield) were measured (machine direction ("MD") and transverse direction ("TD")) in accordance with ASTM D882-97. The film gauge was measured using ASTM D5947-96 Method C, except that the micrometer calibration was performed annually with a commercially available gauge block (Starret Webber 9, JCV1&2).

1% Secant (both MD and TD) was determined in accordance with ASTM D882-97. The film gauge was measured according to ASTM D5947-96 Method C, except that the micrometer calibration was performed annually with a commercially available gauge block (Starret Webber 9, JCV1&2).

Melt Index (I2), i.e., the melt flow rate at 190° C. under a load of 2.16 kg, was determined according to ASTM D-1238-95, condition E. Melt index I2 is reported in units of dg/min, or the numerically equivalent units of g/10 min.

Flow Index (I22), i.e., the melt flow rate at 190° C. under a load of 21.6 kg (sometimes also termed "high load melt index" or "HLMI"), was determined according to ASTM D-1238-95, condition F. Melt index I22 is reported in units of dg/min, or the numerically equivalent units of g/10 min.

The ratio of two melt flow rates is the "Melt Flow Ratio" or MFR, and is most commonly the ratio of I22/I2. MFR can be used generally to indicate a ratio of melt flow rates measured at a higher load (numerator) to a lower load (denominator). As used herein, the term "melt index ratio" or "MIR" refers specifically to the ratio I22/I2. Melt flow ratios are dimensionless.

Density (g/cm3) was determined using chips cut from plaques compression molded in accordance with ASTM D-1928-96 Procedure C, aged in accordance with ASTM D618 Procedure A, and measured according to ASTM D1505-96.

Elmendorf tear was determined in accordance with ASTM D1922-94a. The film gauge was measured according to ASTM D374-94 Method C, except that the micrometer calibration was performed annually with a commercially available gauge block (Starret Webber 9, JCV1&2).

Dart Impact Strength (sometimes termed "dart drop") were measured in accordance with ASTM D1709 Method A, at 26 inches (66 cm).

The film gauge was measured according to ASTM D374-94 Method C, except that the micrometer calibration was performed annually with a commercially available gauge block (Starret Webber 9, JCV1&2).

Hot Set (% elongation) was measured according to IEC 540.

Hot tack was measured according to EMC Method MEZ 003.00.

Seal strength samples were prepared according to EMC Method MEZ 003.001, while testing was done according to a variation of the Zwick Heat Seal Force Method (EMC Method MEZ 143-04).

A measure of composition distribution is the "Composition Distribution Breadth Index" ("CDBI"). The definition of Composition Distribution Breadth Index, and the method of determining CDBI, can be found in U.S. Pat. No. 5,206,075 and PCT Publication No. WO 93/03093. From the weight fraction versus composition distribution curve, the CDBI is determined by establishing the weight percentage of a sample that has a comonomer content within 50% of the median comonomer content on each side of the median. The CDBI of a copolymer is readily determined utilizing well known techniques for isolating individual fractions of a sample of the copolymer. One such technique is Temperature Rising Elution Fractionation (TREF), as described in Wild, et al., J. Poly. Sci., Poly. Phys. Ed., vol. 20, p. 441 (1982). To determine CDBI, a solubility distribution curve is first generated for the copolymer. This may be accomplished using data acquired from the TREF technique. This solubility distribution curve is a plot of the weight fraction of the copolymer that is solubilized as a function of temperature. This is converted to a weight fraction versus composition distribution curve. For the purpose of simplifying the correlation of composition with elution temperature, all fractions are assumed to have a $Mn \geq 15,000$, where Mn is the number average molecular weight of the fraction. Any low weight fractions present generally represent a trivial portion of the polymer. The remainder of this description maintain this convention of assuming all fractions have $Mn \geq 15,000$ in the CDBI measurement.

As used herein, "molecular weight" indicates any of the moments of the molecular weight distribution, such as the number average (Mn), weight average (Mw), or Z-average (Mz) molecular weights, and "molecular weight distribution" is used herein to indicate the ratio of two such molecular weights, although the ratio Mw/Mn is more properly known as a polydispersity index (PDI). In general, molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight $M_n$. When n=1, M is the weight average molecular weight $M_w$. When n=2, M is the Z-average molecular weight $M_z$. These and higher moments are included in the term "molecular weight." The desired molecular weight distribution (MWD) function (such as, for example, $M_w/M_n$ or $M_z/M_w$) is the ratio of the corresponding M values. Measurement of M and MWD by conventional methods such as gel permeation chromatography is well known in the art and is discussed in more detail in, for example, Slade, P. E. Ed., *Polymer Molecular Weights Part II*, Marcel Dekker, Inc., NY, (1975) 287-368; Rodriguez, F., *Principles of Polymer Systems* 3rd ed., Hemisphere Pub. Corp., NY, (1989) 155-160; U.S. Pat. No. 4,540,753; Verstrate et al., *Macromolecules*, vol. 21, (1988) 3360; and references cited therein.

GPC measurements were made on a Waters 150C GPC instrument equipped with a differential refraction index ("DRI") detector. GPC columns are calibrated by running a series of polystyrene standards. Molecular weights of polymers other than polystyrenes are conventionally calculated by using Mark Houwink coefficients for the polymer in question.

Short Chain Branching (SCB) was determined by 1H NMR (proton nuclear magnetic resonance) with data collected at 500 MHz. Spectra were referenced by setting the polymer backbone signal to 1.347 ppm. Methyl group contents in ethylene 1-olefin copolymers were calculated from the 1H NMR spectrum using the following formula:

Methyl Groups/1000 Carbons=$(I_{CH_3}*0.33*1000)/(I_{0.5-2.1ppm}*0.5)$ where $I_{CH_3}$ is the normalized methyl signal area in the region between 0.88 and 1.05 ppm and $I_{0.5-2.1\,ppm}$ is the area between 0.50 and 2.10 ppm. The number of methyl groups will correspond to the number of short chain branches in the polymer assuming that the short chain branches contain 1 methyl (—CH$_3$) group and that all methyl groups are a result of short chain branching. The same NMR method can be used to determine vinyl end unsaturation.

Granular Bulk Density is determined as follows. Granular polymer particles are poured via a ⅞" (2.2 cm) diameter funnel into a fixed volume cylinder of 400 mL. The bulk density is measured as the weight of resin divided by 400 mL to give a value in g/mL.

Particle Size is measured by determining the weight of material collected on a series of U.S. Standard sieves and determining the weight average particle size in micrometers based on the sieve series used.

Extractability is determined according to FDA reg. 21 C.F.R. §177.1520(d)(3)(ii).

For measurements of film properties, the film samples were annealed by heating for 48 hours at 140° F. (60° C.) prior to testing.

Additionally or alternately, the present invention includes, but is not limited to, the following embodiments:

Embodiment 1. A polymer blend comprising:
(a) from 5 wt % to 95 wt % of a HDPE having a density from 0.941 g/cm³ to 0.980 g/cm³ and an I$_{22}$ of 10 dg/min or more; and
(b) from 95 wt % to 5 wt % of a grafted mPE, which is a reaction product of
(i) a mPE having a density from 0.860 g/cm³ to 0.935 g/cm³ and an I$_2$ from 0.7 dg/min to 5.0 dg/min, and
(ii) a silicon-containing grafting component,
wherein the blend exhibits a high-temperature creep after extrusion that is at least 20% lower than a blend of the HDPE and the mPE that has not been grafted with a silicon-containing grafting component.

Embodiment 2. The polymer blend of embodiment 1, wherein the HDPE has a density from 0.951 g/cm3 to 0.964 g/cm3 and an I22 from 14 dg/min to 60 dg/min.

Embodiment 3. The polymer blend of any of embodiments 1-2, wherein the mPE is a mLLDPE, a mVLDPE, or a combination thereof.

Embodiment 4. The polymer blend of any of the previous embodiments, wherein the mPE has a density from 0.912 g/cm3 to 0.932 g/cm3 and an I2 from 0.9 dg/min to 3.5 dg/min.

Embodiment 5. The polymer blend of any of the previous embodiments, wherein the mPE has a density from 0.870 g/cm3 to 0.915 g/cm3 and an I2 from 0.7 dg/min to 3.9 dg/min.

Embodiment 6. The polymer blend of any of the previous embodiments, wherein the blend exhibits a high-temperature creep after extrusion that is at least 40% lower than a blend of the HDPE and the mPE that has not been grafted with the silicon-containing grafting component.

Embodiment 7. The polymer blend of any of the previous embodiments, wherein the blend exhibits a high-temperature creep after extrusion that is at least 50% lower than a blend of the HDPE and the mPE that has not been grafted with the silicon-containing grafting component.

Embodiment 8. The polymer blend of any of the previous embodiments, wherein the blend exhibits a die shrinkage upon extrusion that is at least 10% lower than a blend of the HDPE and the mPE that has not been grafted with the silicon-containing grafting component.

Embodiment 9. The polymer blend of embodiment 8, wherein the die shrinkage of the blend upon extrusion is at least 15% lower than a blend of the HDPE and the mPE that has not been grafted with the silicon-containing grafting component.

Embodiment 10. The polymer blend of any of embodiments 8-9, wherein the die shrinkage of the blend upon extrusion is at least 20% lower than a blend of the HDPE and the mPE that has not been grafted with the silicon-containing grafting component.

Embodiment 11. The polymer blend of any of the previous embodiments, wherein the HDPE comprises 50 wt % to 95 wt % of the blend and the grafted mPE comprises 5 wt % to 50 wt % of the blend.

Embodiment 12. The polymer blend of any of the previous embodiments, wherein the HDPE comprises 65 wt % to 85 wt % of the blend and the grafted mPE comprises 15 wt % to 35 wt % of the blend.

Embodiment 13. The polymer blend of any of the previous embodiments, wherein the grafted mPE grafted is further at least partially crosslinked.

Embodiment 14. The polymer blend of embodiment 13, wherein the at least partially crosslinked mPE has a gel level of at least 10%.

Embodiment 15. The polymer blend of any of embodiments 13-14, wherein the at least partially crosslinked mPE has a gel level of less than 70%.

Embodiment 16. A film comprising at least one layer that comprises the polymer blend of any of the previous embodiments.

Embodiment 17. The film of embodiment 16, wherein the at least one layer also comprises a phenolic antioxidant, a phosphorus-containing antioxidant, and an acid scavenger.

Embodiment 18. The film of any of embodiments 16-17, which comprises no more than three polymeric layers.

Embodiment 19. The film of any of embodiments 16-18, further comprising a layer comprising a surface-active polymeric additive, the repeat unit of which polymeric additive comprises at least one halogen selected from fluorine, chlorine, and bromine.

Embodiment 20. A process for making a film according to any of embodiments 16-19, which process comprises:
contacting a mPE having a density from 0.860 g/cm3 to 0.935 g/cm3 and an I2 from 0.7 dg/min to 5.0 dg/min with a silicon-containing grafting component under conditions sufficient to form a grafted mPE;
mixing the grafted mPE with a HDPE having a density from 0.941 g/cm³ to 0.980 g/cm³ and an I22 of 10 dg/min or more under conditions sufficient to form a polymer blend; and
forming at least one layer of the film by extrusion, wherein the at least one layer comprises the polymer blend,
wherein the at least one layer exhibits a high-temperature creep after extrusion that is at least 20% lower than a layer formed from a blend of the HDPE and the mPE that has not been grafted with a silicon-containing grafting component.

Embodiment 21. The process of embodiment 20, wherein the mPE is a mLLDPE, a mVLDPE, or a combination thereof.

Embodiment 22. The process of any of embodiments 20-21, further comprising contacting the grafted mPE with a crosslinking agent under conditions sufficient to at least partially crosslink the grafted mPE.

Embodiment 23. The process of any of embodiments 20-22, further comprising contacting the polymer blend with a crosslinking agent under conditions sufficient to at least partially crosslink the grafted mPE.

Embodiment 24. The process of any of embodiments 20-23, further comprising sealing at least a portion of the film to form an article comprising a bag.

EXAMPLES

Examples 1-4

In the polymer compositions of Examples 1-4, silane grafting was carried out using SILFIN™ 06, available from Degussa, which includes a vinyltrimethoxysilane silicon-containing grafting agent, a dicumyl peroxide grafting co-agent, and a dibutyltin dilaurate catalyst. Composition specifics are disclosed in Table 1 below.

Conventional additives were added to the polymeric component(s) of the polymer compositions/blends of Examples 1-4, such as antioxidants and pH adjusters. Typical additives included: IRGANOX™ 1076 and IRGANOX™ 1010, phenolic antioxidants available from Ciba Specialty Chemicals; Weston 399, a phosphite stabilizer available from GE Specialty Chemicals; and zinc oxide, as an acid scavenger.

TABLE 1

| Parameter | Example 1 | Example 2 | Example 3 | Example 4 |
|---|---|---|---|---|
| Polymer Composition | 100% Z/N LLDPE | 100% mLLDPE | 80% HDPE 20% mLLDPE | 70% HDPE 30% mLLDPE |
| $I_2$ (dg/min) LLDPE | 3.6 | 2.7 | 1.0 | 2.7 |
| $I_{22}$ (dg/min) HDPE | — | — | 16.0 | 46.0 |
| LLDPE Density (g/cm³) | 0.924 | 0.918 | 0.918 | 0.918 |
| HDPE Density (g/cm³) | — | — | 0.952 | 0.961 |
| Additives (ppmw) | | | | |
| IRGANOX ™ 1076 | 300 | 1500 | 300 | 450 |
| IRGANOX ™ 1010 | — | — | 320 | 280 |
| Weston 399 | 640 | 1750 | 350 | 525 |
| Zinc oxide | 180 | 900 | 180 | 270 |

Examples 1-2 represent LLDPE only, while Examples 3-4 represent blends of LLDPE with HDPE. In each of Examples 1-4, sets of samples were made adding no grafting agent composition to the polymer composition and adding to each polymer composition 1% by weight of the SILFIN™ 06 grafting agent composition. In addition, for Examples 1 and 4, an extra set of samples was made adding to each polymer composition 0.5% by weight of the SILFIN™ 06 grafting agent composition.

The compositions of Examples 1-4, as formulated and as modified with grafting agent composition were extruded using a Killion extruder under the conditions that are delineated in Table 2 below.

TABLE 2

| | | Temperature profile (° C.) | | | | | Extruder conditions | | | | | | |
|---|---|---|---|---|---|---|---|---|---|---|---|---|---|
| | Graft | | | | | | Screw | Die Temp. | Die Temp. | Die Temp. Screw | | Product | | Neck-in from die |
| Ex. # | conc. | Zone 1 | Zone 2 | Zone 3 | FL | Die | rpm | Red | Green | end | Pressure | Output | Thickness | shrinkage |
| 1A | 0 wt % | 175 | 200 | 200 | 200 | 200 | 20 | 193° C. | 188° C. | 215° C. | 130 bar | 3.6 kg/hr | 200 μm | 53% |
| 1B | 0.5 wt % | 175 | 180 | 190 | 190 | 190 | 20 | 189° C. | 185° C. | 205° C. | 145 bar | 3 kg/hr | 200 μm | 40% |
| 1C | 0.5 wt % | 175 | 180 | 190 | 190 | 190 | 25 | 186° C. | 204° C. | 203° C. | 163 bar | 3.7 kg/hr | 200 μm | 40% |
| 1D | 0.5 wt % | 175 | 180 | 190 | 190 | 190 | 30 | 186° C. | 204° C. | 204° C. | 181 bar | 4.5 kg/hr | 200-205 | 40% |
| 1E | 1 wt % | 175 | 180 | 190 | 190 | 190 | 30 | 187° C. | 204° C. | 204° C. | 210 bar | 4.8 kg/hr | 200-205 | 33% |
| 1F | 1 wt % | 175 | 180 | 190 | 190 | 190 | 40 | 189° C. | 181° C. | 205° C. | 235 bar | 6 kg/hr | 200-205 | 33% |
| 1G | 1 wt % | 175 | 180 | 190 | 190 | 190 | 60 | | 206° C. | 250 bar | 3.5 kg/hr | 200-205 | 33% |
| 2A | 0 wt % | 175 | 180 | 190 | 190 | 190 | 20 | | 205° C. | 218 bar | 4.8 kg/hr | 200 μm | 53% |
| 2B | 0 wt % | 175 | 180 | 190 | 190 | 190 | 28 | | 204° C. | 265 bar | 4.5 kg/hr | 200 μm | 53% |
| 2C | 1 wt % | 175 | 180 | 190 | 190 | 190 | 28 | | 204° C. | 298 bar | 4.5 kg/hr | 200 μm | 39% |
| 2D | 1 wt % | 175 | 195 | 195 | 195 | 195 | 28 | | 210° C. | 281 bar | 5 kg/hr | 200 μm | |
| 2D[1] | | | | | | | 28 | 192° C. | 196° C. | 208° C. | 170 bar | | | 50% |
| 2E | 1 wt % | 175 | 195 | 195 | 195 | 195 | 28 | | 209° C. | 215 bar | 4.9 kg/hr | 200 μm | 38% |
| 2F | 1 wt % | 175 | 195 | 195 | 195 | 195 | 37 | 195° C. | 186° C. | 209° C. | 232 bar | 5.6 kg/hr | 200 μm | 40% |
| 3A | 0 wt % | 175 | 195 | 195 | 195 | 195 | 28 | 195° C. | 186° C. | 208° C. | 192 bar | 4.1 kg/hr | 200 μm | 34% |
| 4A | 0 wt % | 175 | 195 | 195 | 195 | 195 | 35 | | 211° C. | 186 bar | | 200 μm | 41% |
| 4B | 0.5 wt % | 175 | 175 | 175 | 175 | 195 | 36 | | 191° C. | 240 bar | 5 kg/hr | 200 μm | |
| 4C | 1 wt % | 175 | 195 | 195 | 195 | 195 | 42 | | 206° C. | 212 bar | 6.8 kg/hr | 200 μm | 34% |
| 4D | 1 wt % | 175 | 195 | 195 | 195 | 195 | 28 | | 205° C. | 173 bar | 4.2 kg/hr | 200 μm | 34% |

[1]Example 2D represents a 2-layer film, with the second layer consisting essentially of a surface-active fluoropolymer; all other samples are monolayers.

The films extruded from Examples 1A, 1C, 1G, 2D, 2F, 4A, 4B, and 4D in Table 2 above were characterized to ascertain various properties thereof, as delineated in Table 3 below.

TABLE 3

| Test | 1A | 1C | 1G | 2D | 2F | 4A | 4B | 4D |
|---|---|---|---|---|---|---|---|---|
| Gel level [%]; samples cured in waterbath for 6 hrs. @80° C. | | 11 | 55 | | 66 | | 12 | 14 |
| Gel level [%]; samples cured in lab ~2 mos. post production | | 16 | 50 | | 63 | | 10 | 14 |
| Avg. thickness (μm)$^a$ | 201 | 210 | 232 | 197 | 200 | 203 | 198 | 205 |
| 1% secant Mod. (MPa)$^a$ | 207 | 202 | 212 | 145 | 137 | 515 | 563 | 497 |
| 10% offset yield stress (MPa)$^a$ | 10.6 | 11.9 | 12 | 8.1 | 9.4 | 18.2 | 25.7 | 20.2 |
| Tensile stress @ break (MPa)$^a$ | 28.3 | 28 | 22 | 41.7 | 42.1 | 43.9 | 21.2 | 23.7 |
| Elongation @ break (MPa)$^a$ | 878 | 739 | 507 | 654 | 535 | 881 | 71 | 455 |
| Energy to break (mJ/mm$^3$)$^a$ | 140 | 120 | 77 | 118 | 105 | 213 | 18 | 91 |
| Creep$^b$ (%), T = 50° C. | 27 | 13 | 10 | 32 | 17 | 5 | 4 | 4 |
| Creep$^b$ (%), T = 80° C. | >200 | 70 | 37 | 170 | 67 | | | |
| Creep$^b$ (%), T = 80° C.† | failed | 87 | 46 | failed | 73 | | | |
| Creep$^b$ (%), T = 100° C. | failed | failed | failed | failed | failed | >200 | 22 | 34 |
| Creep$^b$ (%), T = 100° C.† | | | | | | failed | 23 | 42 |
| Creep$^b$ (%), T = 120° C.†† | | | | | | | 54 | 196 |

$^a$all these properties tested in machine direction (MD) using ASTM D 882.
$^b$all samples subject to a 1.3 kg weight for 5 hours at temperature given using EMC Method MEZ 146, with ASTM D 2990 as an alternative creep test method.
†prior to analysis, samples cured in 50% relative humidity at 23° C.; testing done 6 wks. post production.
††prior to analysis, samples cured in 50% relative humidity at 23° C.; testing done 5 mos. post production.

For films extruded from Examples 2D and 2F, hot tack and seal strength testing was also done. The results are shown in Table 4 below.

TABLE 4

| Test | 2D | 2F |
|---|---|---|
| Hot tack (N/30 mm) | | |
| @120° C. sealing temp. | 0.1 | 0 |
| @130° C. sealing temp. | 1.3 | 0 |
| @140° C. sealing temp. | 3.1 | 0.49 |
| @145° C. sealing temp. | 13.3 | — |
| @150° C. sealing temp. | 11.1 | 2.58 |
| @155° C. sealing temp. | — | 2.98 |
| @160° C. sealing temp. | 8.9 | 3.54 |
| @170° C. sealing temp. | 8.5 | 2.67 |
| @180° C. sealing temp. | — | 2.15 |
| Seal Strength (N/15 mm) | | |
| @130° C. sealing temp. | 0.7 | 0 |
| @140° C. sealing temp. | 7.0 | 1.4 |
| @145° C. sealing temp. | 8.2 | — |
| @150° C. sealing temp. | 33.0 | 24.5 |
| @155° C. sealing temp. | — | 27.0 |
| @160° C. sealing temp. | 36.0 | 31.7 |
| @170° C. sealing temp. | 39.6 | 32.5 |
| @180° C. sealing temp. | — | 33.8 |

All patents, test procedures, and other documents cited herein, are fully incorporated by reference to the extent such disclosure is not inconsistent with this invention and for all jurisdictions in which such incorporation is permitted.

What is claimed is:

1. An extruded polymer film made from a polymer blend comprising:
   (a) from 5 wt % to 95 wt % of a HDPE having a density from 0.941 g/cm$^3$ to 0.980 g/cm$^3$ and an I$_{22}$ from 10 dg/min to 60 dg/min; and
   (b) from 95 wt % to 5 wt % of a grafted mPE, which is a reaction product of
      (i) a mPE having a density from 0.860 g/cm$^3$ to 0.935 g/cm$^3$ and an I$_2$ from 0.7 dg/min to 5.0 dg/min, and
      (ii) a silicon-containing grafting component,
   wherein the blend exhibits a high-temperature creep after extrusion at 100° C. that is at least 20% lower than a blend of the HDPE and the mPE that has not been grafted with a silicon-containing grafting component.

2. The polymer film of claim 1, wherein the HDPE has a density from 0.951 g/cm$^3$ to 0.964 g/cm$^3$ and an I$_{22}$ from 14 dg/min to 46 dg/min.

3. The polymer film of claim 1, wherein the mPE is a mLLDPE, a mVLDPE, or a combination thereof.

4. The polymer film of claim 1, wherein the mPE has a density from 0.912 g/cm$^3$ to 0.932 g/cm$^3$ and an I$_2$ from 0.9 dg/min to 3.5 dg/min.

5. The polymer film of claim 1, wherein the mPE has a density from 0.870 g/cm$^3$ to 0.915 g/cm$^3$ and an I$_2$ from 0.7 dg/min to 3.9 dg/min.

6. The polymer film of claim 1, wherein the blend exhibits a high-temperature creep after extrusion that is at least 40% lower than a blend of the HDPE and the mPE that has not been grafted with the silicon-containing grafting component.

7. The polymer film of claim 1, wherein the blend exhibits a high-temperature creep after extrusion that is at least 50% lower than a blend of the HDPE and the mPE that has not been grafted with the silicon-containing grafting component.

8. The polymer film of claim 1, wherein the blend exhibits a die shrinkage upon extrusion that is at least 10% lower than a blend of the HDPE and the mPE that has not been grafted with the silicon-containing grafting component.

9. The polymer film of claim 8, wherein the die shrinkage of the blend upon extrusion is at least 15% lower than a blend of the HDPE and the mPE that has not been grafted with the silicon-containing grafting component.

10. The polymer film of claim 8, wherein the die shrinkage of the blend upon extrusion is at least 20% lower than a blend of the HDPE and the mPE that has not been grafted with the silicon-containing grafting component.

11. The polymer film of claim 1, wherein the HDPE comprises 50 wt % to 95 wt % of the blend and the grafted mPE comprises 5 wt % to 50 wt % of the blend.

12. The polymer film of claim 1, wherein the HDPE comprises 65 wt % to 85 wt % of the blend and the grafted mPE comprises 15 wt % to 35 wt % of the blend.

13. The polymer film of claim 1, wherein the grafted mPE grafted is further at least partially crosslinked.

14. The polymer film of claim 13, wherein the at least partially crosslinked mPE has a gel level of at least 10%.

15. The polymer film of claim 13, wherein the at least partially crosslinked mPE has a gel level of less than 70%.

16. The polymer film of claim 1 comprising multiple polymeric layers and wherein at least one layer comprises the polymer blend.

17. The polymer film of claim 16, wherein the at least one layer also comprises a phenolic antioxidant, a phosphorus-containing antioxidant, and an acid scavenger.

18. The polymer film of claim 16, which comprises no more than three polymeric layers.

19. The polymer film of claim 16, further comprising a layer comprising a surface-active polymeric additive, the repeat unit of which polymeric additive comprises at least one halogen selected from fluorine, chlorine, and bromine.

20. A process for making a film according to claim 16, which process comprises:

contacting a mPE having a density from 0.860 g/cm$^3$ to 0.935 g/cm$^3$ and an I$_2$ from 0.7 dg/min to 5.0 dg/min with a silicon-containing grafting component under conditions sufficient to form a grafted mPE;

mixing the grafted mPE with a HDPE having a density from 0.941 g/cm$^3$ to 0.980 g/cm$^3$ and an I$_{22}$ from 10 dg/min to 60 dg/min under conditions sufficient to form a polymer blend; and forming at least one layer of the film by extrusion, wherein the at least one layer comprises the polymer blend, wherein the at least one layer exhibits a high-temperature creep after extrusion at 100° C. that is at least 20% lower than a layer formed from a blend of the HDPE and the mPE that has not been grafted with a silicon-containing grafting component.

21. The process of claim 20, wherein the mPE is a mLLDPE, a mVLDPE, or a combination thereof.

22. The process of claim 20, further comprising contacting the grafted mPE with a crosslinking agent under conditions sufficient to at least partially crosslink the grafted mPE.

23. The process of claim 20, further comprising contacting the polymer blend with a crosslinking agent under conditions sufficient to at least partially crosslink the grafted mPE.

24. The process of claim 20, further comprising sealing at least a portion of the film to form an article comprising a bag.

\* \* \* \* \*